United States Patent [19]

Preis

[11] Patent Number: 4,845,898
[45] Date of Patent: Jul. 11, 1989

[54] ORBITAL SANDER

[75] Inventor: Erich Preis, Weinstadt, Fed. Rep. of Germany

[73] Assignee: Licentia Patent-Verwaltungs-GmbH, Frankfurt am Main, Fed. Rep. of Germany

[21] Appl. No.: 92,597

[22] Filed: Sep. 3, 1987

[30] Foreign Application Priority Data

Sep. 4, 1986 [DE] Fed. Rep. of Germany ....... 3630155

[51] Int. Cl.$^4$ .............................................. B24B 23/04
[52] U.S. Cl. .......................... 51/170 MT; 51/170 TL; 51/58; 15/49 R; 15/22 R
[58] Field of Search ........... 51/119, 170 TL, 170 MT, 51/175, 58, 60; 15/49 R, 49 RB, 22 R, 98

[56] References Cited

U.S. PATENT DOCUMENTS

| 1,487,466 | 3/1924 | Norris | 15/49 R |
| 1,667,329 | 4/1928 | Menzel | 51/170 T |
| 3,284,961 | 11/1966 | Graves | 51/170 R |
| 3,287,859 | 11/1966 | Leveque | 51/170 R |
| 3,857,206 | 12/1974 | Heffran, Jr. | 51/170 MT |
| 3,874,125 | 4/1975 | Stroezel | 51/170 TL |

*Primary Examiner*—Frederick R. Schmidt
*Assistant Examiner*—Robert A. Rose
*Attorney, Agent, or Firm*—Spencer & Frank

[57] ABSTRACT

An orbital sander having a sanding plate braced via elastic elements, the plate being capable of being set into reciprocating motion by an eccentric drive element that can be set into rotation by the armature shaft of the drive motor. The eccentric drive element is an outer wheel of an asymmetrical planetary gear, with a sun wheel disposed on the drive shaft.

6 Claims, 2 Drawing Sheets

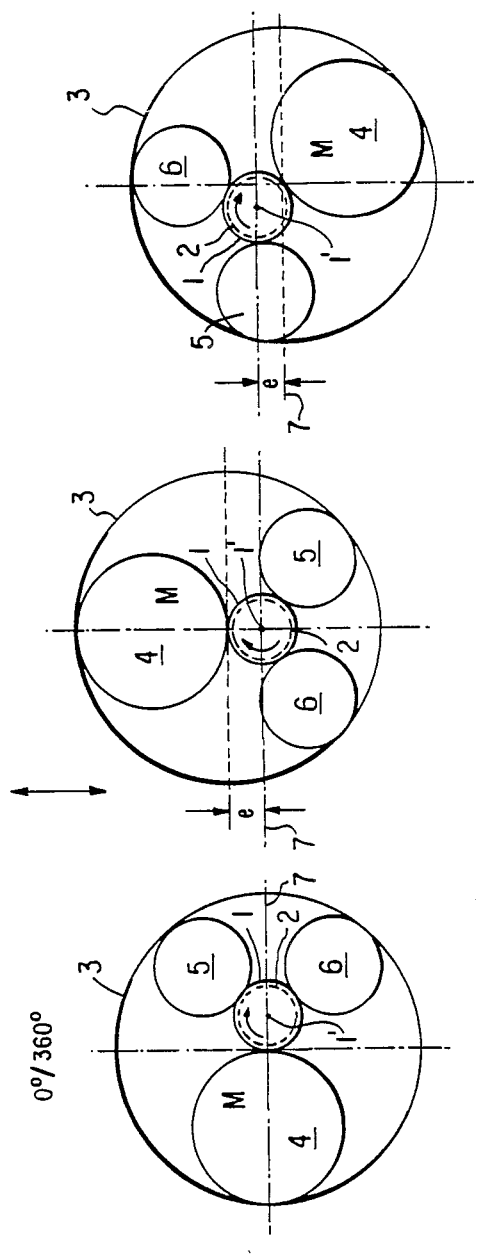

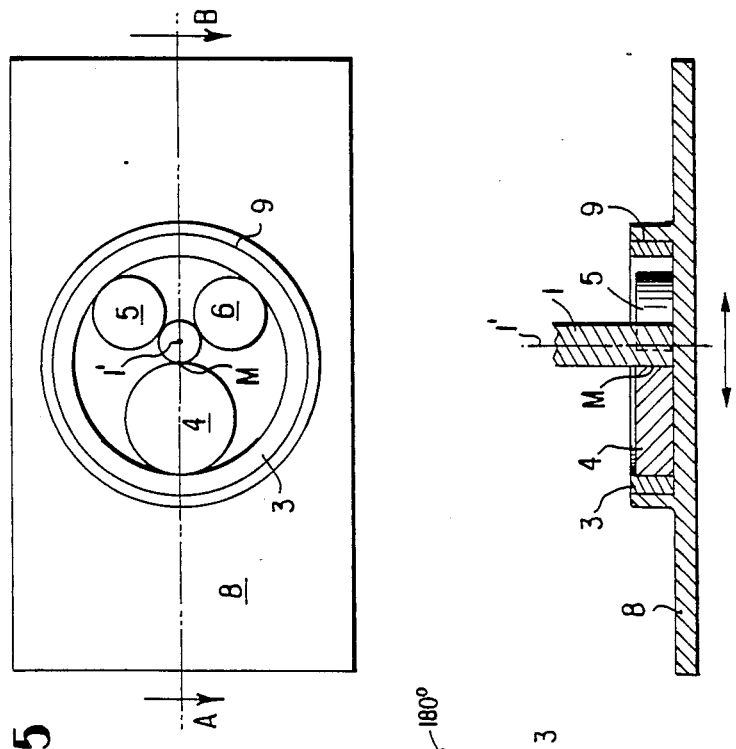
FIG. 5
FIG. 6
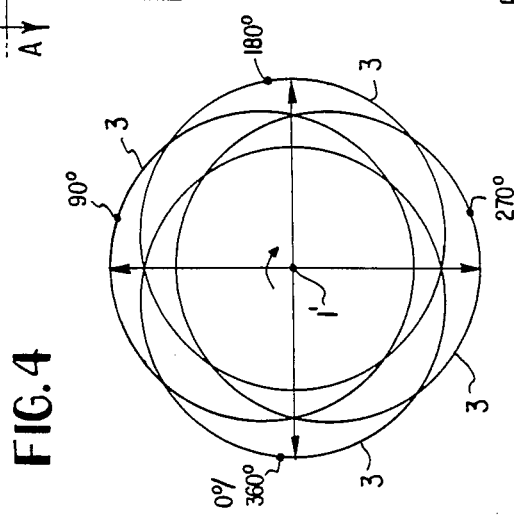
FIG. 4

ORBITAL SANDER

BACKGROUND OF THE INVENTION

The invention relates to an orbital sander and more particularly to an orbital sander having a sanding plate capable of being set into reciprocating motion by an eccentric drive element driven either directly or indirectly by the armature shaft of a drive motor.

Conventional orbital sanders of this type typically have no reduction gear between the armature shaft of the drive motor and the drive shaft of the sanding plate, so that the armature shaft and drive shaft are identical.

However, orbital sanders of this generic type are also known in which the rpm of the drive motor is stepped down by means of a conventional gear and the oscillation frequency of the sanding plate is correspondingly reduced. The gears used for this purpose occupy a not inconsiderable amount of installation space, however, and they are also expensive.

It is an object of the invention to provide a gear design that with minimum installation space and at minimal cost enables a reduction, selectable within a relatively wide range, of the rpm of the armature shaft of the drive motor.

SUMMARY OF THE INVENTION

This object is attained in accordance with the invention by providing that the eccentric drive element consists of an outer wheel of an asymmetrical planetary gear having a sun wheel disposed on the drive shaft. With this provision, the gear and the eccentric element form a structural unit which is compact and economical.

In accordance with another feature of the invention the outer wheel has internal teeth, the sun wheel of the planetary gear is embodied by the drive pinion of the armature shaft of the drive motor, and the drive pinion is in engagement with at least two planet wheels of different diameters that mesh with the internal teeth of the outer wheel, wherein all the gear wheels have the same modulus. A further feature of the invention is that the planetary gear includes three planet wheels in engagement with the sun wheel and the internally toothed outer wheel, of which planet wheels one has a larger diameter than the other two.

In an alternate embodiment, the sun wheel, the planet wheels and the outer wheel may be embodied as a friction wheel system.

BRIEF DESCRIPTION OF THE DRAWINGS

Preferred embodiments of the will be described below, referring to the drawings, which schematically shows an exemplary embodiment having three planet wheels. In the drawings:

FIGS. 1-3 schematically illustrate the disposition and structure of the asymmetrical gear at various positions of the planet wheels;

FIG. 4 shows the orbital motion of the outer wheel;

FIG. 5 is a plan view on the planetary gear and sanding plate and

FIG. 6 is a sectional view taken along the line A-B of FIG. 5.

DESCRIPTION OF THE PREFERRED EMBODIMENTS

The asymmetrical planetary gear shown in schematic fashion in FIGS. 1-3 has gear wheels of the same modulus and includes a sun wheel 2, mounted on the armature shaft or drive shaft 1 of the drive motor (not shown), with which three planet wheels 4, 5 and 6 that engage internal teeth of an outer wheel 3 mesh. Of these three planet wheels, the wheel 4 has a larger diameter than the other two wheels 5 and 6.

The term "modulus" as used herein means a quantity related to the pitch of the gears. More specifically, the modulus M is given by $M = t/\pi$ where t is the pitch (spacing) of the gear teeth. The pitch or modulus of all gears (2-6) must be the same.

In such an orbital sander using a Type VS 14 W 500 motor, an idle speed of 25,000 rpm, a reduced rpm of 7000 and an overall sanding stroke of 5 mm, the gears may be provided with a modulus of 1.25 mm and an optimum gear ratio results with the larger planet wheel 4 having a diameter of 15 mm, the sun wheel 2 having a diameter of 10 mm and the outer wheel 3 having an inner diameter of 35 mm, so that the positive and negative strokes (eccentricity) of the outer wheel relative to its center of motion is 2;5 mm.

Upon rotation of the sun wheel 2, the three planet wheels roll on it and on the internal teeth of the outer wheel 3, which may optionally also be elastically deformable within limits. Because of the different sizes of the planet wheels and the unchanging location of the drive shaft 1, the outer wheel 3 executes a rotary movement about the drive shaft axis 1', which is eccentric to the center point M of the outer wheel 3. Because of this eccentric motion, there is a positive and negative stroke e of the outer wheel 3 in the longitudinal direction (see the double arrow) whith respect to the "starting position" shown in FIG. 1 (center line 7), and overall, there is an orbital movement of the outer wheel 3, as illustrated in principle in FIG. 4. The starting position of the outer wheel 3 in FIG. 4 corresponds to that of FIG. 1 (0°/360°).

As FIGS. 5 and 6 show, the motion of the eccentric element embodied by the outer wheel is transmitted to the sanding plate 8, which has a circular recess 9 in which the outer wheel 3 is disposed and mechanically firmly joined to the sanding plate.

The reduction according to the invention of the rpm of the drive shaft enables a considerable increase in the rpm of the drive motor and hence, if the structural size of the motor remains the same, an increase in the drive output as well.

Instead of the planetary gear with gear wheels of the same modulus, a planetary arrangement of friction wheels can also be provided, even for the sun wheel 2 (with the outer wheel having a frictional internal surface). The schematic drawings of Figs. 1-6 also illustrate such an embodiment. Optionally, regardless of whether a planetary gear with gear wheels or friction wheels is used, it is also possible for only two planet wheels, of different diameters, to be provided.

Although the preferred embodiment as disclosed herein has three planet gear wheels with one wheel having a larger diameter than the other equal diameter wheels, it is also permissible that all three planet wheels have different diameters.

The present disclosure relates to the subject matter of out patent application No. 3630155.8 filed in the Federal Republic of Germany on Sept. 4, 1986, the entire specification of which is incorporated herein by reference.

It is to be understood that various other modifications will be apparent to (and can readily be made by) those skilled in the relevant art without departing from the scope and spirit of this invention. Therefore, it is not intended that the scope of the claims appended hereto be limited to the description as set forth herein, but rather that the claims be construed as encompassing all the features of patentable novelty.

What is claimed is:

1. In an orbital sander having a sanding plate braced via elastic elements, a drive motor with an armature shaft, a drive shaft and an eccentric drive element, the plate being reciprocable by eccentric rotation of the eccentric drive element, the eccentric drive element being driven through the drive shaft by the armature shaft of the drive motor, the improvement comprising:

an asymmetrical planetary gear arrangement having a sun wheel disposed on said drive shaft and an outer wheel forming said eccentric drive element, said outer wheel engaging said plate.

2. An orbital sander as in claim 1, wherein said planetary gear arrangement includes three planet wheels in engagement with said sun wheel and an internal surface of said outer wheel, one of said three planet wheels having a larger diameter than the other two of said three planet wheels.

3. An orbital sander as in claim 2, wherein said outer wheel has internal teeth and said sun wheel and said three planet wheels have external teeth.

4. An orbital sander as in claim 1, wherein said outer wheel has internal teeth and said asymmetrical planetary gear includes at least two planet wheels of different diameters that mesh with said internal teeth of said outer wheel, said sun wheel comprising a drive pinion on said armature shaft, said drive pinion engaging said at least two planet wheels, with said at least two planet wheels, said drive pinion and said outer wheel, all having a same modulus.

5. An orbital sander as in claim 4, wherein said at least two planet wheels include three planet wheels in mesh with said drive pinion and said internal teeth of said outer wheel, one of said three planet wheels having a larger diameter than the other two of said three planet wheels.

6. In an orbital sander having a sanding plate braced via elastic elements, a drive motor with an armature shaft, a drive shaft and an eccentric drive element, the plate being reciprocable by eccentric rotation of the eccentric drive element, the eccentric drive element being driven through the drive shaft by the armature shaft of the drive motor, the improvement comprising:

a frictional sun wheel disposed on said drive shaft;

an outer wheel having an internal fricional surface, forming said eccentric drive element and engaging said plate, and at least two frictional planet wheels in a planetary arrangement with said sun wheel inside and in rolling frictional engagement with said internal surface of said outer wheel and said sun wheel, wherein one of said at least two planet wheels having a larger diameter than the remaining of said at least two planet wheels, said sun wheel, said planet wheels and said outer wheel forming an asymmetrical planetary friction wheel system.

* * * * *